Aug. 2, 1955 J. H. STEIN 2,714,657
APPARATUS FOR OBTAINING R-F RESPONSE CURVES
Filed Sept. 14, 1945
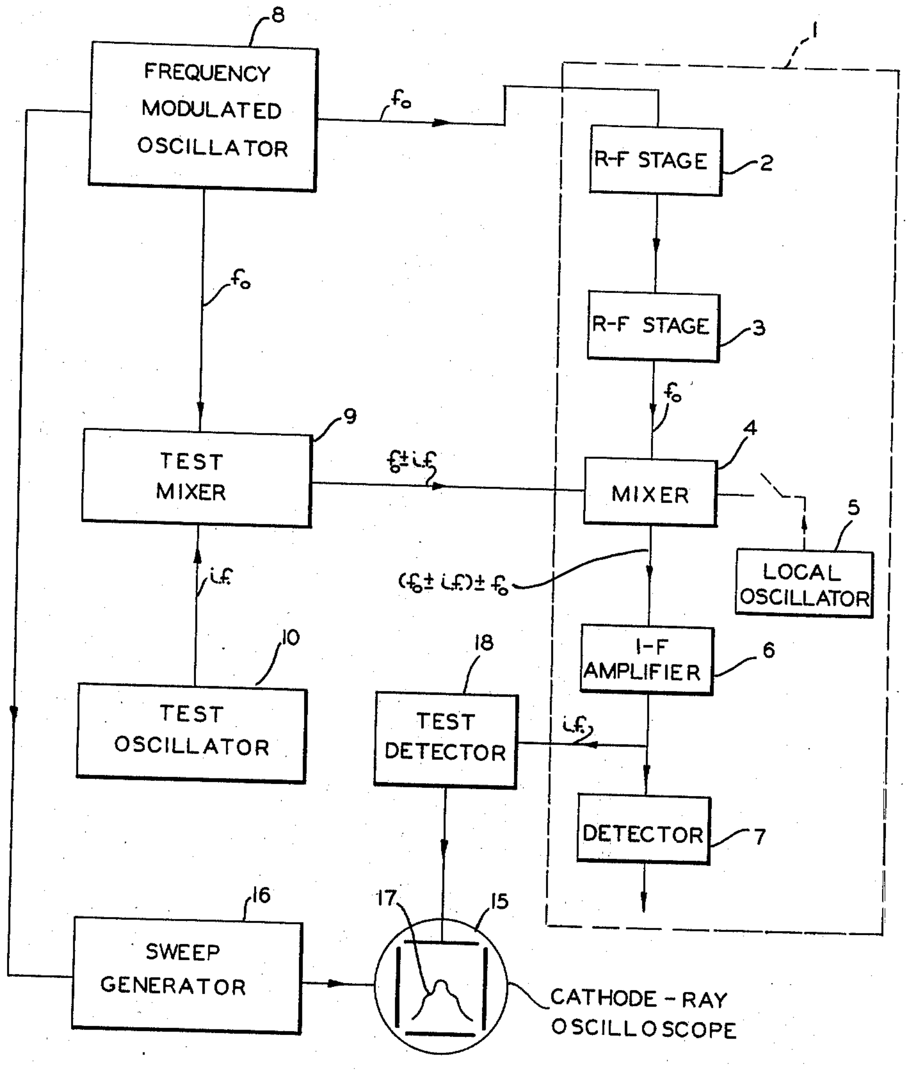
INVENTOR.
JAMES H. STEIN
BY
Ralph L. Chappell
ATTORNEY 2,714,657

APPARATUS FOR OBTAINING R.-F. RESPONSE CURVES

James H. Stein, Toms River, N. J., assignor to the United States of America as represented by the Secretary of the Navy Application September 14, 1945, Serial No. 616,390

6 Claims. (Cl. 250—20)

The present invention relates to a method of testing radio circuits and components and more particularly to a method and system for providing automatically, an accurate visual trace of the response of a radio unit as a function of frequency.

According to prior art methods for producing frequency response curves, it has been necessary to plot a series of points in order to provide the desired curve. In practising the present invention, the frequency response curve or trace is automatically shown instantaneously.

Accordingly an object of the present invention is to produce an accurate visual or recorded trace of the response of a radio unit as a function of frequency.

Another object of the invention is to provide a method and system of showing automatically and instantaneously a frequency response curve.

Still another object of the invention is to heterodyne the output from a frequency modulated oscillator with that from a fixed test oscillator and to then heterodyne the result with the output from the component being tested to provide a signal which may be made to indicate the frequency response of the component.

These and other objects will be apparent from the following specification when taken with the accompanying drawing which is a block diagram of one embodiment of the invention.

Referring particularly to the drawing, there is illustrated a broad band superheterodyne receiver 1 which includes radio frequency stages 2 and 3, a mixer 4, a local oscillator 5, an intermediate frequency amplifier 6 and a detector 7. The test equipment in the embodiment of the invention disclosed includes a frequency modulated oscillator 8 having a flat output over the range of frequencies to be tested. The output is designated as $f_0$ and it is fed to the input of the radio frequency stage 2 and into a test mixer 9. Associated with the test mixer 9 is a test oscillator 10 operating at a fixed frequency I. F. The frequency I. F. is substantially equal to that of the intermediate frequency amplifier 6 of the receiver 1 and it is fed to the test mixer 9. The output from the test mixer 9 will then be $f_0 \pm$I. F. which output is fed to the mixer 4. The test mixer 9 should be designed for a flat output response over the range of frequencies $f_0 \pm$I. F.

A cathode ray oscilloscope 15 is provided for indicating the frequency response curves. Associated with the cathode ray oscilloscope 15 is a sweep generator 16 for driving the sweep of the cathode ray oscilloscope 15 in a conventional manner. The sweep 17 of the oscilloscope 15 is deflected by the output from I. F. amplifier 6 through a test detector 18.

In the operation of the method and system according to the present invention, the test components, as described and illustrated, are connected to the receiver 1, the frequency response characteristics of the radio frequency stages of which it is desired to observe. At the same time the local oscillator 5 should be disconnected from the mixer 4, so that the only frequencies fed to the mixer 4 are the output from the radio frequency stage 3 and the output from the test mixer 9. The sweep generator 16 should be so synchronized with the output of the frequency modulated oscillator 8, that the lowest frequency of the frequency modulated oscillator 8 is at the start of the sweep and the highest frequency is at the end of the sweep. It will be understood that by synchronizing the sweep with the frequency band of the oscillator 8, time, as shown by the sweep of the oscilloscope 15 is interpreted in frequency because the rate of change in frequency is made linear over whatever operating band is used. The result is that the base of the frequency response curve as traced by the sweep of the oscilloscope 15 represents frequency in equally spaced divisions and makes possible the use of calibrated scales, not shown.

Since the output from the mixer 4 is $(f_0 \pm$I. F.$) \pm f_0$, the normal frequency response characteristics of the intermediate frequency amplifier 6 will eliminate all frequencies except the I. F. frequency, which is the output of the test oscillator 10. The frequency response characteristics of the I. F. amplifier of the receiver will, therefore, introduce no amplitude distortion. The amplified signal from the I. F. amplifier is then rectified in test detector 18, and the envelope of the rectified voltage during a complete cycle of frequency modulation is in accordance with the response characteristics of the radio frequency stages 2 and 3.

An outstanding advantage of the method and system according to the present invention resides in the fact that the selected beat output signal (I. F.) of mixer 4 is of a constant frequency, thereby eliminating amplitude distortion due to the frequency-response characteristics of the devices from the output side of mixer 4 to oscilloscope 15. The present invention is not limited in its application to broad-band, superheterodyne receivers. It is equally useful for checking and the tracking of multiple tuned radio frequency stages in superheterodyne receivers. It extends also to both broad-band and tuned radio frequency stages generally, for obviously, a mixer and an intermediate frequency amplifier may be added to the test equipment where these are not already a part of the unit being tested. Likewise any radio frequency channel, such as an amplifier, filter, attenuator or the like, may be checked for its frequency response characteristic. Furthermore, instruments other than cathode ray oscilloscopes may be employed for showing the frequency response form. For example, pen recorders may be substituted although in the case of a pen recorder, it may not be necessary to synchronize the sweep of the high frequency oscillator with the recorder.

Having thus described my invention what I have desired to secure by Letters Patent and claim is:

1. A system for obtaining the frequency response curve of the radio-frequency stages of a radio receiver having at least a mixer and an intermediate frequency amplifier comprising, a generator of frequency modulated signals, a test oscillator for generating signals at the intermediate frequency of said receiver, a test mixer, means for connecting the outputs of said test oscillator and said generator to said test mixer, an oscilloscope, means connecting said generator to said radio-frequency stages of said receiver, means for synchronizing the modulation frequency of said generator with the sweep frequency of said oscilloscope, means connecting the output of said test mixer to the mixer of said radio receiver, and a test detector connected for demodulating the output of said intermediate frequency amplifier, said oscilloscope being connected to the output of said detector for indicating the frequency response curve of said radio-frequency stages.

2. Apparatus for checking the frequency response characteristics of the radio frequency stages of a receiver having at least a mixer, an intermediate frequency amplifier and a local oscillator, said local oscillator being disconnected from said receiver, comprising, an oscillator for providing a frequency modulated signal to said radio frequency stages, a test mixer, a test oscillator operating in the pass band of said intermediate frequency amplifier, means for applying the output of said frequency modulated oscillator and said test oscillator to said test mixer, means for combining the outputs of said test mixer and of said radio frequency stages in said mixer of said receiver, the output of said mixer of said receiver being applied to said intermediate frequency amplifier of said receiver as a signal of constant frequency equal to that of the output of said test oscillator, a test detector for demodulating the output of said intermediate frequency amplifier, a cathode ray oscilloscope, means for generating sweep voltages for said cathode ray oscilloscope at the modulation frequency of said frequency modulated oscillator, and means for applying the output of said test detector to said cathode ray oscilloscope, whereby a response curve of amplitude versus frequency of said radio frequency stages is traced thereon.

3. Apparatus for checking the frequency response characteristics of the radio frequency stages of a receiver having at least a mixer, an intermediate frequency amplifier and a local oscillator, said local oscillator being disconnected from said receiver, comprising, a frequency modulated oscillator for providing a variable frequency signal $f_0$, means for applying said signal $f_0$ to said radio frequency stages, a test oscillator for providing a signal of fixed frequency $f_1$, said signal of frequency $f_1$ lying in the pass band of said intermediate frequency amplifier, a test mixer for combining said signals $f_0$ and $f_1$ to produce output signals of frequencies $f_0 \pm f_1$, means for applying said test mixer output to the mixer of said receiver, the output of said radio frequency stages also being applied to the mixer of said radio receiver, the output signals of said radio receiver mixer being $(f_0 \pm f_1) \pm f_0$, said intermediate frequency amplifier passing substantially only frequency $f_1$, a test detector for demodulating the output of said intermediate frequency amplifier, a cathode ray oscilloscope being swept at the modulation frequency of said frequency modulated oscillator, and means for displaying the output of said test detector on said cathode ray oscilloscope as a response curve of amplitude versus frequency of said radio frequency stages.

4. Apparatus for indicating the frequency response characteristics of the radio frequency stages of a receiver, said receiver having at least a local oscillator, a mixer and an intermediate frequency amplifier, said local oscillator being disconnected from said receiver, said apparatus comprising, a frequency modulated oscillator for providing a signal to said radio frequency stages, a test mixer, a test oscillator for providing a signal of fixed frequency at the center of the pass band of said intermediate frequency amplifier, means for combining the outputs of said frequency modulated oscillator and of said test oscillator in said test mixer, means for applying the output of said test mixer to the mixer of said receiver, the output of said radio frequency stages also being applied to the mixer of said receiver, the output of the mixer of said receiver being applied to said intermediate frequency amplifier as a signal of the same frequency as that of said test oscillator, a test detector for demodulating the output of said intermediate frequency amplifier, a cathode ray oscilloscope, a sweep generator, means for synchronizing the operation of said sweep generator with said frequency modulated oscillator such that signals of lowest frequency from said frequency modulated oscillator correspond in time to the lowest potential point of each of the sweep voltages from said sweep generator and that signals of highest frequency from said frequency modulated oscillator correspond in time with the highest potential point of each of the sweep voltages from said generator, means for applying the output of said detector to first opposed deflection plates of said cathode ray oscilloscope, and means for applying said sweep voltages to second opposed deflection plates of said cathode ray oscilloscope whereby a response curve of amplitude versus frequency of said radio frequency stages is traced thereon.

5. Apparatus for checking the frequency response characteristics of the radio frequency stages of a receiver having at least a mixer, an intermediate frequency amplifier and a local oscillator, said local oscillator being disconnected from said receiver, comprising, a first source of frequency modulated signals coupled to said radio frequency stages, a second source of frequency modulated signals derived from said first source of frequency modulated signals and coupled to said mixer, the signals from said first and second sources at all times differing in frequency by a fixed frequency difference, said frequency difference being equal to a frequency that will be passed by said intermediate frequency amplifier, means coupling the output of said radio frequency stages to said mixer, the output of said mixer of said receiver being applied to said intermediate frequency amplifier of said receiver as a signal of constant frequency, a test detector for demodulating the output of said intermediate frequency amplifier, a cathode ray oscilloscope, means for generating sweep voltages for said cathode ray oscilloscope, means coupling said sweep generating means to said first source of frequency modulated signals whereby the lowest potential point of said sweep voltages corresponds in time to the lowest frequency of said first source of frequency modulated signals and the highest potential point of said sweep voltages corresponds in time to the highest frequency of said first source of frequency modulated signals, and means for applying the output of said test detector to said cathode ray oscilloscope, whereby a response curve of amplitude versus frequency of said radio frequency stages is traced thereon.

6. Apparatus for checking the frequency response characteristics of a high frequency electric component comprising, a first source of frequency modulated signals coupled to said high frequency component, a second source of frequency modulated signals derived from said first source of frequency modulated signals, the signals from said first and second sources at all times differing in frequency by a fixed frequency difference, a mixer having a first input coupled to said high frequency component and a second input coupled to said second source of frequency modulated signals, an intermediate frequency amplifier coupled to said mixer, said intermediate frequency amplifier having a pass band including a frequency equal to said fixed frequency difference of said two sources, a test detector for demodulating the output of said intermediate frequency amplifier, a cathode ray oscilloscope, means for generating sweep voltages for said cathode ray oscilloscope, means coupling said sweep generating means to said first source of frequency modulated signals whereby the lowest and highest potential points of said sweep voltages correspond in time to the lowest and highest signal frequencies of said first source of frequency modulated signals, respectively, and means for applying the output of said test detector to said cathode ray oscilloscope, whereby a response curve of amplitude versus frequency of said radio frequency stages is traced thereon.

References Cited in the file of this patent

UNITED STATES PATENTS

| | | |
|---|---|---|
| Re. 21,955 | Chaffee | Nov. 25, 1941 |
| 2,024,614 | Terry | Dec. 17, 1935 |
| 2,128,801 | Cooley | Aug. 30, 1938 |
| 2,130,032 | Robins | Sept. 13, 1938 |
| 2,162,827 | Schrader | June 20, 1939 |
| 2,252,058 | Bond | Aug. 12, 1941 |
| 2,416,346 | Potter | Feb. 25, 1947 |
| 2,502,294 | Wallace | Mar. 28, 1950 |
| 2,581,847 | Espenschied et al. | Jan. 8, 1952 |

OTHER REFERENCES

Moulic: "Panoramic Principles," Electronic Industries, July 1944, pages 86–88 and 206.